United States Patent
Diem et al.

(10) Patent No.: US 10,265,873 B2
(45) Date of Patent: Apr. 23, 2019

(54) METHOD AND GONIORADIOMETER FOR THE DIRECTION-DEPENDENT MEASUREMENT OF AT LEAST ONE PHOTOMETRIC OR RADIOMETRIC CHARACTERISTIC QUANTITY OF AN OPTICAL RADIATION SOURCE

(71) Applicant: LMT Lichtmesstechnik GmbH Berlin, Berlin (DE)

(72) Inventors: Carsten Diem, Berlin (DE); Thomas Reiners, Berlin (DE); Dieter Sorowka, Berlin (DE); Konstantin Radewald, Berlin (DE); Peter Lange, Berlin (DE)

(73) Assignee: LMT LICHTMESSTECHNIK GMBH BERLIN, Berlin (DE)

( * ) Notice: Subject to any disclaimer, the term of this patent is extended or adjusted under 35 U.S.C. 154(b) by 23 days.

(21) Appl. No.: 15/128,393

(22) PCT Filed: Mar. 11, 2015

(86) PCT No.: PCT/EP2015/055011
§ 371 (c)(1),
(2) Date: Sep. 22, 2016

(87) PCT Pub. No.: WO2015/144431
PCT Pub. Date: Oct. 1, 2015

(65) Prior Publication Data
US 2017/0165848 A1   Jun. 15, 2017

(30) Foreign Application Priority Data
Mar. 24, 2014   (DE) .................. 10 2014 205 430

(51) Int. Cl.
*G01J 3/50*   (2006.01)
*B25J 19/06*   (2006.01)
(Continued)

(52) U.S. Cl.
CPC ......... *B25J 19/063* (2013.01); *B25J 19/0004* (2013.01); *B25J 19/022* (2013.01);
(Continued)

(58) Field of Classification Search
CPC .......... G01J 1/04; G01J 1/0403; G01J 1/0242; G01J 1/02; G01J 1/0214; G01J 1/0271; G01J 1/0414; G01J 1/06; G01J 2001/4247
See application file for complete search history.

(56) References Cited

U.S. PATENT DOCUMENTS

| | | | |
|---|---|---|---|
| 7,256,880 B2 | 8/2007 | Binder et al. | |
| 2006/0023222 A1* | 2/2006 | Binder | G01J 1/04 356/446 |

(Continued)

FOREIGN PATENT DOCUMENTS

DE   10-2004-037355 A1   3/2006

OTHER PUBLICATIONS

International Search Report of corresponding PCT/EP2015/055011, dated Jul. 21, 2015, 4 pages.
(Continued)

*Primary Examiner* — Ryan Rink
(74) *Attorney, Agent, or Firm* — Lewis Roca Rothgerber Christie LLP (57) ABSTRACT

A method and a gonioradiometer for the direction-dependent measurement of at least one photometric or radiometric characteristic of an optical radiation source. The emission direction of the photometric or radiometric characteristic is described using a system of planes (A, B, C), the planes of which intersect at an intersection line which passes through the radiation centroid of the radiation source, and using an emission angle (α, β, γ) which specifies the emission direction (α, β, γ) within a considered plane. A sensor or the
(Continued)

radiation source is fastened to a multi-axis articulated robot. The robot is configured to only swivel about precisely one of its axes during a measuring process, in which measurement values relating to different emission angles ($\alpha$, $\beta$, $\gamma$) within a considered plane of the system of planes (A, B, C) or to different planes at a considered emission angle ($\alpha$, $\beta$, $\gamma$) are detected.

18 Claims, 9 Drawing Sheets

(51) Int. Cl.
*G01J 1/02* (2006.01)
*B25J 19/00* (2006.01)
*B25J 19/02* (2006.01)
*B25J 19/04* (2006.01)
*G05B 19/4061* (2006.01)
*G01J 1/42* (2006.01)

(52) U.S. Cl.
CPC .......... *B25J 19/023* (2013.01); *B25J 19/04* (2013.01); *G01J 1/0242* (2013.01); *G01J 3/504* (2013.01); *G01J 3/505* (2013.01); *G05B 19/4061* (2013.01); *G01J 2001/4247* (2013.01); *G01J 2001/4261* (2013.01)

(56) References Cited

U.S. PATENT DOCUMENTS

| | | | |
|---|---|---|---|
| 2009/0216373 A1* | 8/2009 | Berti | G01N 23/2073 700/258 |
| 2010/0328672 A1* | 12/2010 | Mou | G01J 1/02 356/446 |
| 2014/0001318 A1* | 1/2014 | Ehrenleitner | B25J 9/0048 248/122.1 |
| 2017/0113347 A1* | 4/2017 | Ehrenleitner | B25J 9/1638 |
| 2017/0162287 A1* | 6/2017 | Waldschlager | G01N 23/20008 |

OTHER PUBLICATIONS

Patelay, "Robots automate goniophotometer characterization of LED systems," LEDs Magazine Online, pp. 1-7.
"Lichtmessung—Teil 1: Photometrische Verfahren," Apr. 1999, Deutsche Norm, DIN 5032-1, pp. 1-14.
"Robots and robotic devices—Coordinate systems and motion nomenclatures," ISO, Third edition, May 1, 2013, Reference No. ISO 9787:2013(E) © ISO 2013 (20 pages).
"The Measurement of Absolute Luminous Intensity Distributions," International Commission on Illumination, Publication No. 70, 1987, Central Bureau of the CIE, © CIE 1987 (54 pages).
English Translation of Chinese Office action dated Nov. 9, 2017 issued in corresponding Chinese Application No. 201580016320.9 dated Apr. 2, 2018, 7 pages.

* cited by examiner

METHOD AND GONIORADIOMETER FOR THE DIRECTION-DEPENDENT MEASUREMENT OF AT LEAST ONE PHOTOMETRIC OR RADIOMETRIC CHARACTERISTIC QUANTITY OF AN OPTICAL RADIATION SOURCE

CROSS-REFERENCE TO A RELATED APPLICATION

This application is a National Phase Patent Application of International Patent Application Number PCT/EP2015/055011, filed on Mar. 11, 2015, which claims priority of German Patent Application Number 10 2014 205 430.3, filed on Mar. 24, 2014.

BACKGROUND

The invention relates to a method and a gonioradiometer for the direction-dependent measurement of at least one photometric or radiometric characteristic of an optical radiation source.

Gonioradiometers are generally employed to measure photometric or radiometric characteristics of lamps and luminaires. These are opto-mechanical measurement systems, by means of which the directional dependence of variables for describing optical radiation is determined. By way of example, depending on the employed sensor or measuring instrument head it is possible to determine the luminous intensity distribution or the color distribution body of a light source. The centroid of the optical or radiation source to be tested is arranged in the rotational centre of the Gonioradiometer which corresponds to the coordinate origin of a spherical coordinate system. In this arrangement, photometric and radiometric characteristics can be measured goniometrically, i.e. for all directions of emission, by moving the optical or radiation source with respect to the sensor or by moving the sensor with respect to the optical or radiation source in the required angular ranges.

The photometric or radiometric characteristics of the source are determined by evaluating individual directions and/or by integrating the measurement results over portions or the whole solid angle of a distribution body.

A photometric or radiometric characteristic such as the luminous intensity of a light source is a direction-dependent variable, the emission direction of which can generally be specified by two angles in a coordinate system linked to the light source. In practice, the description by specific systems of planes has prevailed, said systems of planes being denoted A-planes, B-planes and C-planes. These planes are defined in the standard DIN 5032 part 1 (1999). A corresponding definition is also found in the document CIE No. 70 (1987): "The measurement of absolute luminous intensity distributions", Central Bureau of the CIE, ISBN 3 900 734 05 4.

In practice, specific gonioradiometer types have proven their worth; these are likewise defined in DIN 5032 part 1 and in document CIE No. 70 (1987), the description of which is incorporated by reference. In particular, type 1.1 to 1.3 gonioradiometers, in which the light source is moved during a measurement while the sensor remains fixed, and type 4 gonioradiometers, in which the sensor is moved while the light source remains fixed, are of interest. In both cases, the light source or radiation source with its light centroid or radiation centroid is attached to the center of the gonioradiometer. A, B or C planes are measured, depending on the type of gonioradiometer. Lighting testing centers or laboratories must keep different gonioradiometers available in order to be able to serve all measurement objectives.

There is a need for a gonioradiometer for the direction-dependent measurement of at least one photometric or radiometric characteristic of an optical radiation source, which can easily realize different goniometer types and, accordingly, selectively detect measurement values in, e.g., A planes, B planes or C planes. Moreover, a corresponding method for the direction-dependent measurement of such characteristics of an optical radiation source is to be provided.

SUMMARY

According to a first aspect of the invention, a method is provided in which the sensor or the radiation source is fastened to a holder of a multi-axis articulated robot. It is provided that the robot only swivels about precisely one of its axes during a measuring process, in which measurement values relating either to different emission angles within a considered plane of a system of planes or to different planes at a considered emission angle are detected.

The solution according to this aspect of the invention is based on the discovery that a movement of the radiation source or of the sensor may be carried out by a multi-axis articulated robot, wherein, however, a swivel movement is only carried out about precisely one of the axes of the robot during a measuring process for detecting measurement values in relation to different emission angles within a considered plane or in relation to different planes in the case of a considered emission angle. What is achieved by swiveling the robot about only one of its axes is that unwanted tolerances are minimized when determining the emission direction. This is because the tolerances for the individual axes would add up if the employed robot were to carry out a movement about a plurality of axes—which is naturally possible, as a matter of principle, when using a multi-axis articulated robot.

Hence, this aspect of the invention realizes a measuring process with swiveling of a robot about only precisely one of its axes and thereby enables an effective measurement which is afflicted by minimal tolerances. It reduces the parameter space of a multi-axis articulated robot, which is distinguished by a large number of degrees of freedom, to the extent that there is swiveling about only precisely one of the axes during a measuring process relating to measurement values in relation to different emission angles within a considered plane or in relation to different planes in the case of a considered emission angle.

At the same time, by using a multi-axis articulated robot, it is possible to differently align the axis about which swiveling takes place during a measuring process in such a way in space that a measurement is performed in one of the standardized systems of planes (A plane, B plane and C plane). As a result, it is no longer necessary to keep available different gonioradiometer types for measurements in different systems of planes.

The solution according to this aspect of the invention therefore renders it possible to calculate a predetermined solid angle with low tolerances by recording planes of a system of planes lying close together. At the same time, the programming is comparatively simple since the robot is swiveled about only precisely one of its axes during a measuring process. Here, provision can be made for the moved axis to be driven at a speed from the start angle of the solid angle to be recorded to the end angle by way of a command, wherein acceleration and deceleration ramps are placed outside of the solid angle to be examined. The advantages lie in simple programming, low tolerances (since only one of the axes of the robot is moved during a measuring process) and short measurement times due to low acceleration and deceleration times of the moved axis.

The invention performs measurements using a system of planes, in which the planes of a system of planes intersect at an intersection line which passes through the radiation centroid of the radiation source. A specific plane of a system of planes is identified by a first angle. A second angle, the emission angle, is defined within such a plane, said emission angle specifying the emission direction of the radiation within a considered plane. Therefore, a specific point in space is defined, firstly, by means of a first angle which identifies the plane and by means of a second angle which specifies the emission direction within the considered plane. The three standardized systems of planes A, B and C differ in terms of their arrangement in relation to the light source and in terms of their definition of two reference axes, as described in DIN 5032 part 1 in detail, with reference being made in a complementary manner to this description.

The solution according to the first aspect of the invention comprises two alternatives. The first alternative describes a measuring process during which the robot is swiveled about only precisely one of its axes and measurement values are detected in relation to different emission angles within a considered plane of a selected system of planes. In this alternative the emission angle is varied within a considered plane during the swiveling of the robot about precisely one axis and measurement values are detected for the different emission angles.

In accordance with the second alternative of claim 1, measurement values relating to different planes at a considered emission angle are detected during the swiveling of the robot about precisely one axis. Hence, measurement values relating to different planes in the case of a constant considered emission angle are detected when swiveling the robot about precisely one of its axes. In the case where the system of planes contains A planes, "circles of latitude" are measured in this second variant.

In accordance with one embodiment, provision is made, prior to swiveling about a swivel axis, for the sensor or the radiation source to be positioned by the robot in such a way that the radiation centroid of the radiation source lies on the swivel axis. This ensures that the spatial position of the radiation centroid of the radiation source is not modified when swiveling the robot about the swivel axis and, instead, the radiation source remains in the center of the gonioradiometer.

A further embodiment provides for the robot to carry out a continuous movement during the swiveling at least over individual angular ranges (i.e. portion-by-portion or over the whole swivel region) and for the sensor to continuously record measurement values during this continuous movement. Such a continuous movement during the swiveling can also be referred to as a scanning movement or a scanning process. Continuously recording of measurement values during a scanning process is a highly effective mode of operation for recording measurement values since it is not necessary for individual spatial points to be approached separately by the robot, in which case the robot or the swivel arm or arms involved would disadvantageously have to be accelerated and decelerated between the individual points in each case. Instead, a continuous movement is carried out, during which measurement values are recorded continuously. By way of example, provision can be made for a measurement value to be recorded for each hundredth degree of a swivel movement. The measurement values recorded during a scanning process therefore enable a finely resolved detection of the angle distribution when detecting a lighting or radiometric characteristic.

The method further provides for the robot to be adjusted in terms of at least one further swivel axis for the purposes of measuring the lighting or radiometric characteristic in a different plane of the system of planes considered or at a different emission angle before the robot is once again swiveled about the single swivel axis. The measurement therefore consists of a successive sequence of measuring processes, wherein each measuring process is accompanied by the swiveling of the robot about precisely one swivel axis, and wherein a different plane of the system of planes or a different emission angle is set between individual measuring processes by virtue of the robot being adjusted in terms of at least one of its further swivel axes.

The gonioradiometer can be realized with various sensors. Examples of employable sensors are spectroradiometers, photometers, photomultipliers and infrared-, ultraviolet- and color probe heads.

Furthermore, a sensor within the meaning of the present invention is any sensor which can measure optical radiation, i.e. ultraviolet radiation, radiation of visible light or infrared radiation within the wavelength window from approximately 100 nm (UV-C) to 1 mm (IR-C). A sensor within the meaning of the present invention can therefore detect a wavelength, or a wavelength range, within the aforementioned wavelength window.

By way of example, the luminous intensity distribution or the color distribution on a spherical surface around the radiation source is measured as lighting or radiometric characteristic. Provision can also be made for spectroradiometric information to be detected, i.e. there can be a spectrum-resolved detection of a lighting or radiometric characteristic. In general, what applies here is that a lighting value is the photometric equivalent of a corresponding radiometric value. Thus, the photometric evaluation of light sources is carried out by means of lighting variables such as luminous intensity, luminous flux, illuminance and luminance. Here, the sensitivity of the human eye is taken into account by means of brightness sensitivity curves. Photometric or lighting units can be calculated from radiometric units.

A second aspect of the present invention relates to a gonioradiometer. The gonioradiometer is characterized by a multi-axis articulated robot, to which the sensor or the radiation source is fastened. The swivel arms of the robot, more precisely its swivel axes are positioned in such a way that the robot is only swiveled about precisely one of its axes during a measuring process, in which measurement values relating to different emission angles within a considered plane of a system of planes or to different planes at a considered emission angle are detected.

An embodiment provides for the sensor or the radiation source to be fastened to a holder of the robot in an overhead position. In such an overhead position, there is a maximum freedom of movement for the largest possible luminaires and rotations in the range from −180° to +180°.

A further embodiment provides for the robot to be a 6-axis articulated robot. However, the invention is by no means restricted thereto and the robot can also have a different number of axes of rotation, but it does have at least three.

In accordance with one embodiment, a six-axis articulated robot is operated in such a way that it realizes a type 1 gonioradiometer. Here, the light source is fastened to the robot and it is moved during a measuring process, while the sensor is arranged in a fixed manner, preferably in the far field of the light source in which the light source only still appears as a point.

Thus, provision can be made for a six-axis articulated robot to realize a type 1.1 gonioradiometer. Here, the axes of the robot are aligned in such a way that, during a measuring process in which measurement values relating to different emission angles within a considered plane of the system of planes are detected, the robot is only swiveled about its sixth axis and that there is swiveling about the first axis for selecting a different axis of the system of planes.

In accordance with a further embodiment, a six-axis articulated robot likewise realizes a type 1.1 gonioradiometer. In this embodiment, the axes of the robot are aligned in such a way that, during a measuring process in which measurement values relating to different planes of the system of planes at a considered emission angle are detected, the robot is only swiveled about its sixth axis, wherein there is swiveling at least about the fourth axis for selecting a different emission angle. In doing so, there is a measurement of a "circle of latitude" during a measuring process, wherein the planes (A planes) are varied during the measuring process while the emission angle is constant. A different emission angle is set during subsequent measurements.

In accordance with a further embodiment, a six-axis articulated robot realizes a type 1.2 gonioradiometer. Here, the axes of the robot are aligned in such a way that, during a measuring process in which measurement values relating to different emission angles within a considered plane of the system of planes are detected; the robot is only swiveled about its first axis and that there is swiveling at least about the fifth axis for selecting a different axis of the system of planes.

Here, provision can be made for the robot to be aligned in such a way that, in the case of angles $B_x$ of the planes of the system of planes B at which x>0° and at which there may be collisions between the radiation source or the radiation source holder and articulated arms of the robot, the corresponding B-planes are rotated by 180° by rotation about the sixth axis and measurements are carried out in the planes rotated by 180°, wherein there likewise is a rotation by 180° about the fifth axis in order to reach the collision-free region.

In accordance with a further embodiment, the six-axis articulated robot realizes a type 1.3 gonioradiometer. Here, the axes of the robot are aligned in such a way that, during a measuring process in which measurement values relating to different emission angles within a considered plane of the system of planes (C planes) are detected, the robot is only swiveled about its first axis and there is swiveling about the sixth axis for selecting a different plane of the system of planes (C planes).

A further embodiment provides for the six-axis articulated robot to realize a type 4 gonioradiometer. Here, the at least one sensor is fastened to the robot and moved during a measuring process. By contrast, the light source is fixed. The sensor is guided on a virtual spherical surface, at the center of which the light centroid of the light source is situated. Here, the system of planes is formed by planes which extend through the center of a sphere which is formed by the radiation centroid of the radiation source. Therefore, data corresponding to a great circle on the spherical surface of a sphere, at the center of which the radiation centroid of the radiation source is situated, are recorded during a measuring process.

Provision can be made during the operation of a type 4 gonioradiometer for the robot to be aligned in such a way that during a measuring process in which measurement values relating to different emission angles within a considered plane of the system of planes are detected, the robot is only swiveled about its sixth axis and that there is swiveling about the first axis for selecting a different plane of the system of planes.

Furthermore, provision can be made during the operation as a type 4 gonioradiometer for the sensor to be connected to the robot by way of a side arm in such a way that the sensor passes over a great circle around the radiation centroid of the radiation source when swiveling the robot about the sixth axis. Here, use can also be made of two sensors which are arranged at an angular distance of 180° from one another at the arms of two corresponding side arms.

BRIEF DESCRIPTION OF THE DRAWINGS

The invention will be explained in more detail on the basis of a plurality of exemplary embodiments, with reference being made to the figures, in which.

DETAILED DESCRIPTION

Before the invention is explained in more detail on the basis of FIGS. 1 to 7 relating to exemplary embodiments, the background of the invention is initially explained on the basis of FIGS. 8 to 12 in order to aid an improved understanding of the invention.

Figure 8:
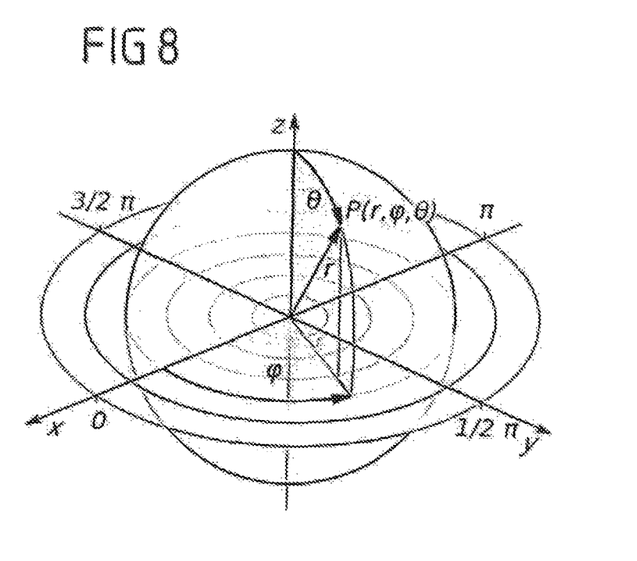
FIG. 8 shows the illustration of a spherical coordinate system with definitions of the angles phi and theta.

FIG. 8 depicts a spherical coordinate system which illustrates the definition of the angles phi $\varphi$ and theta $\theta$. If a radiation source is situated at the origin of such a spherical coordinate system, lighting or radiometric characteristics of the radiation source can be measured goniometrically, i.e. for all directions, by moving the radiation source or by moving a sensor successively in the angular ranges −180°≤φ180° and 0≤θ≤180°. Hence, an emission direction can be defined by two angles φ, θ.

It is conventional to describe the luminous intensity distribution, or any other direction-dependent photometric or radiometric characteristic, using specific systems of planes, which are denoted A planes, B planes and C planes and which are explained in the DIN 5032 part 1, which is explained above. Each system of planes defines two axes which intersect at the light centroid of the light source. A first axis is given by an intersection line in which all planes of the system of planes intersect. The second axis is given by the orientation of the lamp in the radiation source.

In the case of A planes, the individual planes are characterized by angles $A_x$ with −180°≤X≤180°. Within an A plane, directions or emission angles α are specified by angles α of −90°≤α≤90°.

In the case of B planes, the individual planes are characterized by angles $B_x$ with −180°≤X≤180°. Within a B plane, directions are specified by angles β of −90°≤β≤90°.

In the case of C planes, the individual planes are characterized by angles $C_x$ with 0°≤X≤360°. Within a C plane, directions are specified by angles γ of 0°≤γ≤180°.

Returning to FIG. 8, it is noted that, to the extent the polar axis extends parallel to the z-axis, the angles φ and θ describe a C system of planes $C_x$, γ, where φ=$C_x$ and θ=γ.

Figure 9:
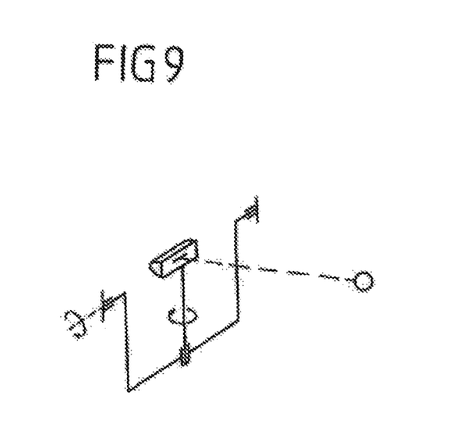
FIG. 9 schematically shows a type 1.1 goniometer with a spatially fixed horizontal axis and a spatially movable vertical axis for measuring A planes and B planes.
Figure 10:
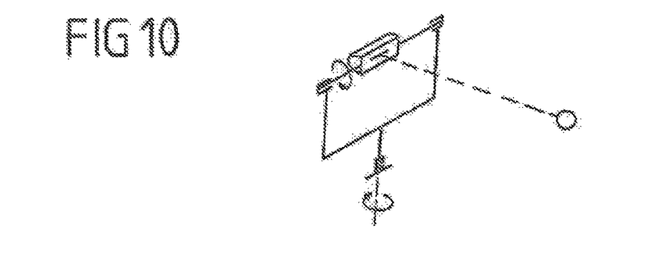
FIG. 10 schematically shows a type 1.2 goniometer with a spatially fixed vertical axis and a spatially moved horizontal axis for measuring A planes and B planes.
Figure 11:
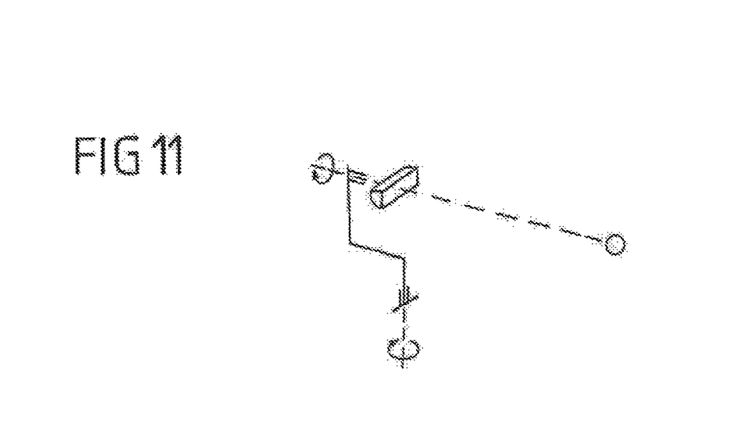
FIG. 11 schematically shows a type 1.3 goniometer with a spatially fixed vertical axis and a spatially movable horizontal axis, wherein the luminaire is perpendicular to the moved axis for the purposes of measuring C planes.

FIGS. 9 to 11 schematically show type 1.1 to 1.3 gonioradiometers. Schematically depicted in each case is a radiation source with a light-emitting region, a sensor (circular) and two axes, about which the radiation source can be swiveled. One of the axes is fixed in space, i.e. the spatial alignment of said axis does not change when swiveling the radiation source about this axis. The other axis is not fixed in space since the spatial alignment of the other axis necessarily changes when swiveling around the fixed axis.

In the case of a type 1.1 goniometer in accordance with FIG. 9, there is a horizontal axis which is fixed in terms of its spatial position and an axis which can move in terms of its spatial position, said axis extending vertically in the illustration of FIG. 9 but changing its spatial position when the arrangement is swiveled about the horizontal axis. There is a measurement of A planes or B planes.

Therefore, a type 1.1 gonioradiometer used to measure A planes realizes a horizontal axis which is fixed in terms of its spatial position. In the case where the arrangement with the radiation source is moved or scanned about the fixed, horizontal axis, A planes are recorded, with the emission angle α being varied. By contrast, in the case where the vertical axis moves at a fixed α during a measuring process, the parameter $A_x$ is varied and so the fixed sensor runs on a spherical surface on "circles of latitude". The latter mode of operation is typically used for characterizing motor vehicle headlamps.

There is a fixed vertical axis and a movable horizontal axis in a type 1.2 gonioradiometer in accordance with FIG. 10. There likewise is a measurement in A planes or B planes. There is a fixed vertical axis and a movable horizontal axis in a type 1.3 gonioradiometer in accordance with FIG. 11. The measurement is carried out in C-planes.

Furthermore, type 4 gonioradiometers (not depicted separately) are known and realizable by means of a gonioradiometer according to the invention, as will still be explained below. In the case of a type 4 gonioradiometer, there is a fixed light source and an arrangement by means of which a sensor or probe head of the gonioradiometer can be guided on a virtual spherical surface, at the center of which the light centroid of the light source is situated. Therefore, type 4 gonioradiometers serve to establish the irradiance or illuminance distribution on a spherical surface, so as to derive integral variables such as radiant flux or luminous flux therefrom. The light source is held in the center of this sphere with an intended orientation (standing, hanging, lying).

Figure 12:
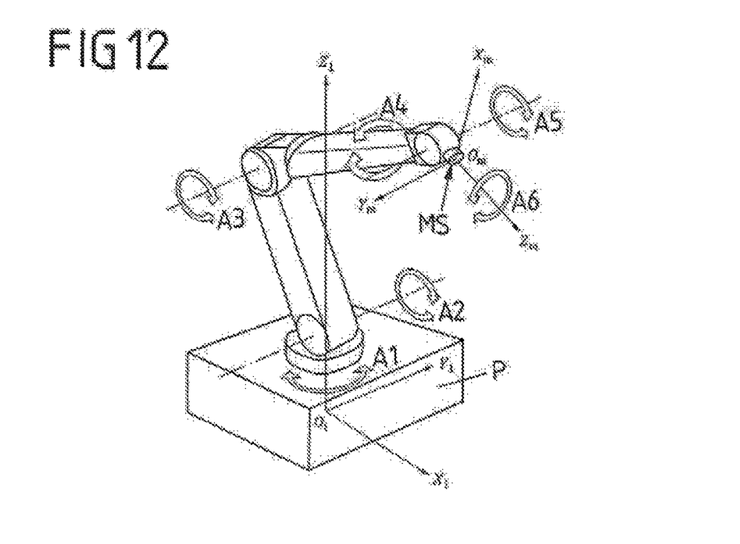
FIG. 12 schematically shows a six-axis articulated robot, known from the prior art, for realizing translations and rotations in space pursuant to ISO 9787, Annex A.

FIG. 12 shows a six-axis articulated robot for carrying out translations and rotations in space. Such a robot is described in the international standard ISO 9787, Annex A, from which FIG. 12 has been taken and which is incorporated by reference herewith. The robot has a total of six axes of rotation, which are denoted axes A1, A2, A3, A4, A5 and A6. The robot is arranged on a base P, which defines a horizontal plane aligned perpendicular to the swivel axis A1 of the robot. Below, modes of operation of such a multi-axis articulated robot are described for realizing a gonioradiometer in accordance with types 1.1, 1.2, 1.3 and 4, wherein a light or radiation source is connected to a mechanical interface MS, for example in the form of an assembly flange, which is situated on the axis A6, i.e. the axis arranged most distant from the axis A1.

Alternatively, the luminaire or radiation source can be connected to a side arm which is assembled on the axis A6.

Figure 1:
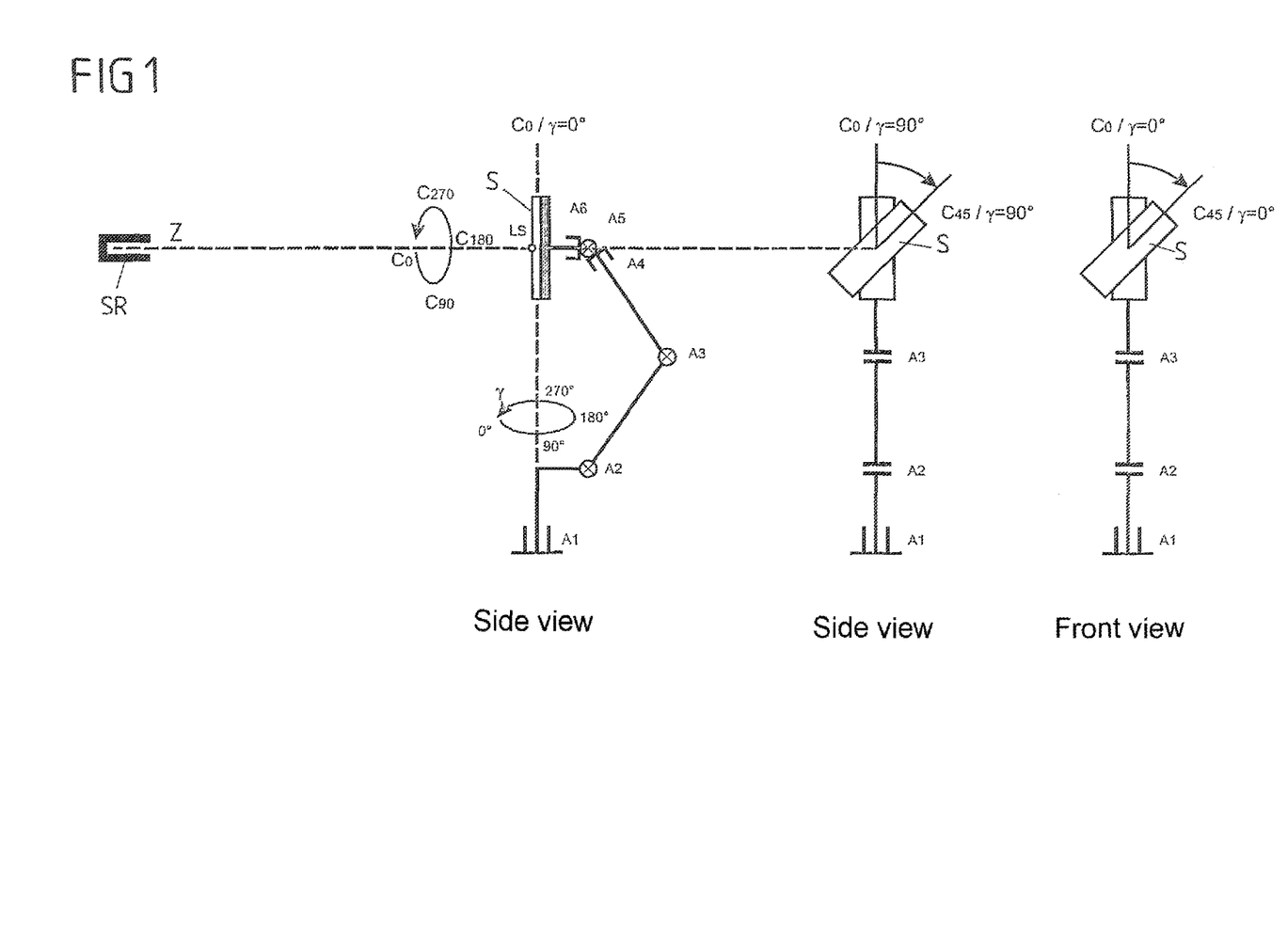
FIG. 1 shows a gonioradiometer according to the invention in a mode of operation in which a type 1.3 gonioradiometer is realized.

In light of the preceding explanations, a first exemplary embodiment of the present invention using a six-axis articulated robot in accordance with FIG. 12 is now described on the basis of FIG. 1.

FIG. 1 schematically shows a six-axis articulated robot, the axes of which are aligned in such a way that they realize a type 1.3 gonioradiometer. The robot comprises six axes A1, A2, A3, A4, A5, A6. The axis A1 is fastened so as to be able to swivel on a foot or a base. A radiation source S is mounted by way of fastening means (not depicted in any more detail) on the axis A6. The radiation source has a light centroid LS. The radiation source S is e.g. a light source, for example a lamp, which emits light in the visible spectrum. It can likewise be a radiation source which emits light in the infrared spectral range or in the ultraviolet spectral range.

Moreover, provision is made for a sensor SR, which is designed to detect radiation which is emitted by the radiation source S and is emitted along the z-axis of a coordinate system which has its origin in the light centroid LS. The sensor SR is arranged in a manner stationary in space.

The position of the radiation source S can be varied in space by way of the six axes A1 to A6 of the robot. For the purposes of realizing a type 1.3 gonioradiometer, the axes A2, A3 and A4 are positioned in such a way that the light centroid LS of the radiation source S lies in the continuation of the axis A1. Furthermore, provision is made for the axis A5 to align the emission axis of the radiation source S in such a way that the z-axis of the coordinate system points to the sensor SR. The axes A2, A3, A4, A5 are set once and not adjusted during the course of the measurements.

In the type 1.3 gonioradiometer of FIG. 1, C planes are set by the axis A6. Within a set C plane, directions γ are specified by the axis A1. The operation is such that the robot is only swiveled about the axis A1 during a measuring process, in which measurement values relating to different emission angles within a considered C plane are detected. The sensor SR continuously records measurement values during this continuous movement. Such swiveling about the axis A1 is denoted as measuring process. Another C plane is set by swiveling the radiation source S about the axis A6. There subsequently is, once again, a measuring process. The whole C plane family can therefore be measured very quickly and with economical movements of the axes by step-by-step driving of the angle $C_x$ over the axis 6 and in each case subsequently scanning in the C plane by means of the axis 1.

As already explained above, the axes A2, A3, A4 and A5 are only set once at the start of the measurement in order to bring the luminaire S into position and align it in relation to the sensor SR.

Although not necessary, provision is further made in the embodiment described here for the second axis A2 to be operated in the so-called "overhead position", which leads to the point of rotation of the axis A6 being brought into the extension of the first axis A1. In this case, the light centroid LS of the radiation source S comes into the extension of the first axis A1, and so a C plane, the angle γ of which can be varied by the axis A1, is set by only moving the axis A6.

The use of the overhead position is advantageous in that the emission angle γ is not restricted in any way and all movement forms required for the type 1.3 goniometer can easily be represented.

The central side view of FIG. 1 shows the arrangement after swiveling by γ=90° about the axis A1. Furthermore, the radiation source S is depicted in two different C planes ($C_0$ and $C_{45}$). The front view of FIG. 1 likewise shows the radiation source S in two different C planes (i.e. after an appropriate rotation about the axis A6), namely the planes $C_0$ and $C_{45}$ in the case of an emission angle γ of zero.

Figure 2:
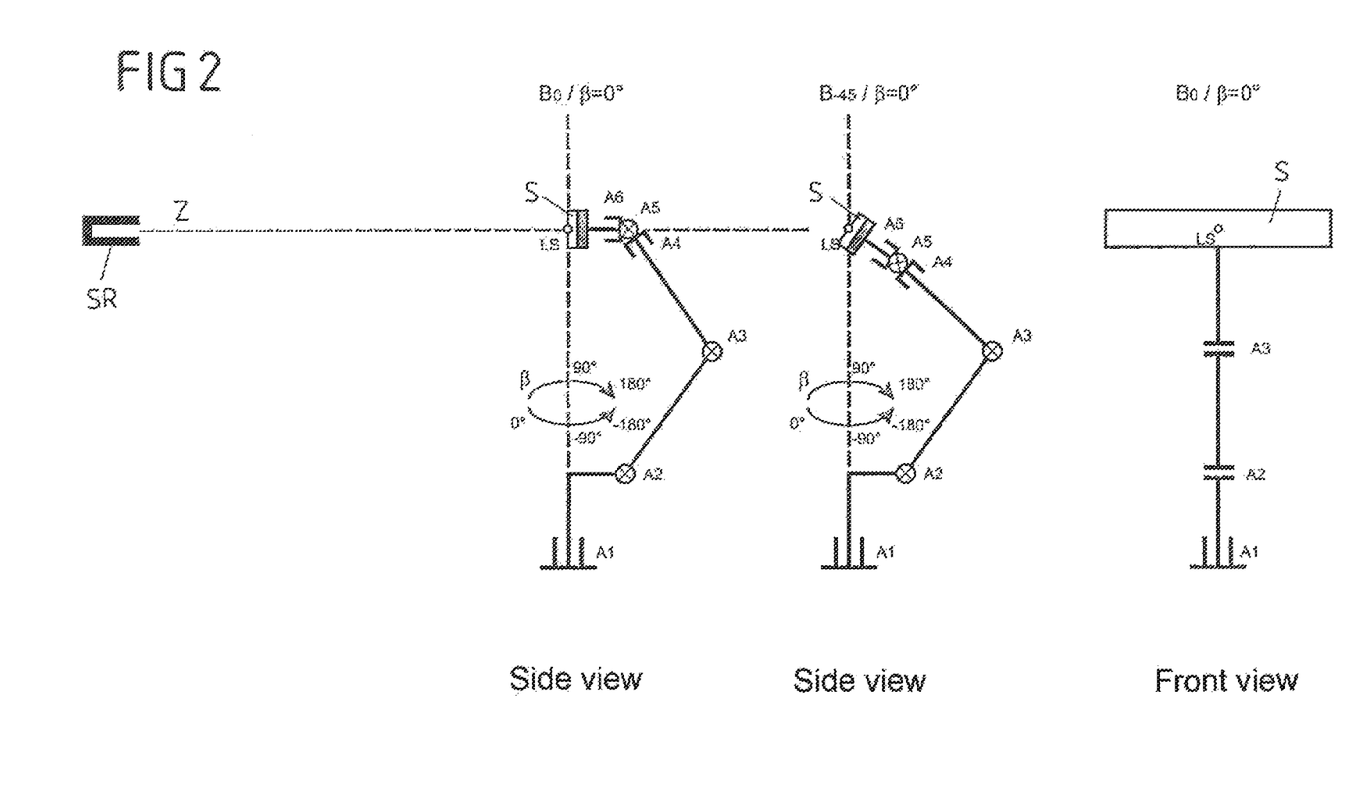
FIG. 2 shows a gonioradiometer according to the invention in a mode of operation in which a type 1.2 gonioradiometer is realized in a first refinement.
Figure 3:
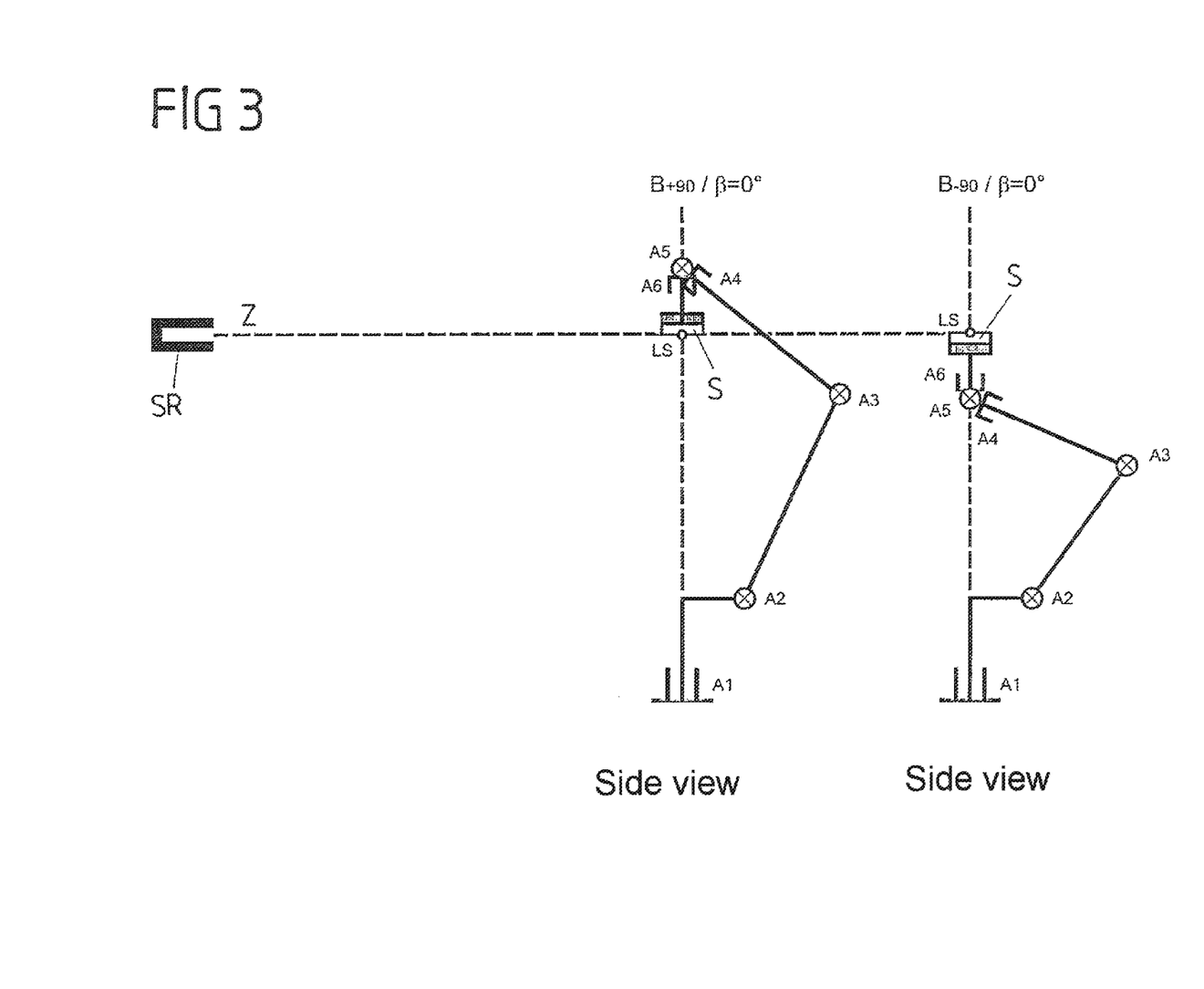
FIG. 3 shows a gonioradiometer according to the invention in a mode of operation in which a type 1.2 gonioradiometer is realized in a second refinement.

FIGS. 2 and 3 show a six-axis articulated robot in which the swivel arms of the robot or its axes are positioned in such a way that the robot realizes a type 1.2 gonioradiometer.

Pursuant to DIN 5032, the B and C planes merely differ by a different direction of the luminaire or the radiation source, but both operate with a vertical fixed axis and a horizontal moved axis. Hence, the preferred axis configuration for this application is identical to the axis configuration described in relation to FIG. 1, but with a different alignment of the radiation source S. Hence, a holder of the radiation source S is provided in such a way that it is rotated by 90° in relation to the alignment in FIG. 1, wherein the light centroid LS of the radiation source S continues to be positioned in the continuation of the axis A1.

During a measuring process, in which measurement values relating to different emission angles β within a considered B plane are detected, the robot is only swiveled about its axis A1 For the purposes of selecting a different plane of the B system of planes, there is swiveling about the axis A5. The angle $B_x$ is set by varying the axis A5, while the emission angle β during a swivel or scan is varied within a B plane by means of the axis A1.

In order to obtain the light centroid LS, the axes A2 and A3 are still corrected, where necessary, if a new B plane or a new corresponding angle $B_x$ is intended to be set. During a scan or a measuring process there is, however, only a rotation about the axis A1, while the other axes are rigid. Therefore, there can be a manipulation of a number of axes between various scans or measuring processes in order to set a new plane of the considered system of planes. During a measuring process for measuring the emission angles within a considered plane there is, however, only swiveling about precisely one axis.

The overhead position, in which the axes A2, A3 and A5 are used to set a B plane while maintaining the light centroid is also the preferred arrangement in FIG. 2. The axis A6 aligns the luminaire axis for β=0, both perpendicular to the connecting line between light centroid LS and sensor SR and perpendicular to the axis A1.

In the left-hand side view of FIG. 2, a B plane with the angle $B_0$ is considered, while this is a B plane with the angle $B_{-45}$ in the central side view of FIG. 2. The emission angle β is zero in both cases. The right-hand front view of FIG. 2 shows the B plane with the angle $B_0$ and the emission angle β=0.

The holder shown in FIG. 2 has limits, particularly if the radiation sources (e.g. luminaires) are relatively large; if these are e.g. typical linear fluorescent luminaires. Limits are connected with such a holder because the light centroid LS, and hence also the mass of the radiation source in this case, edge further and further away from the assembly flange. The preferred operation is therefore an assembly of the luminaire with a light centroid and mass centroid fixed close to the assembly flange.

In the arrangement in accordance with FIG. 2, it is the case that the setting of B planes with $B_x \geq 0°$, in particular with $B_x \geq 90°$, is critical because the holding flange of the radiation source S and the radiation source S itself can collide with the swivel arm between the axis A3 and the axis A4. This problem can be solved by rotating the axis A6 by 180°, as result of which, very generally, the B plane $B_{+x}$ is transformed into the B plane $B_{-180-x}$, and so B-planes of the luminaire can also be measured in the upper, free angular range above the robot as an alternative to the lower region where there is a risk of collision. This is depicted in FIG. 3 for x=90°. When moving the axis A5 through 180°, the luminaire moves from B=−90° into the position B=+90°. However, if the axis A6 is now rotated by 180°, B=−90° is transformed into B=+90°. In the left-hand side view, FIG. 3 shows the arrangement which emerges from the right-hand side view of FIG. 3 by rotation by 180° about the axis A5 and by 180° about the axis A5.

Therefore, for angles $B_x$ in which there are collisions between the radiation source (luminaire), or the holder of the radiation source, and the articulated arms of the robot, provision can be made in the B planes for the corresponding B planes to be effected by rotation of the axis A5 by 180° and a measurement in the planes rotated by 180°.

Figure 4:
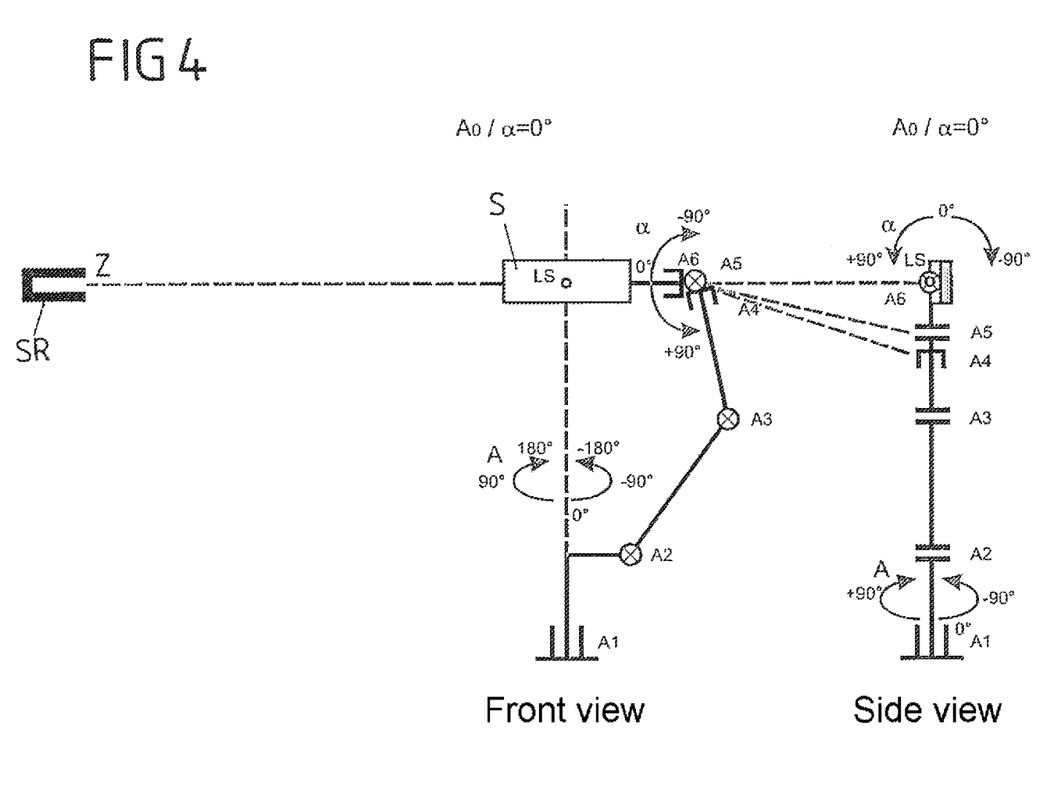
FIG. 4 shows a gonioradiometer according to the invention in a mode of operation in which a type 1.1 gonioradiometer is realized, in a first mode of operation.
Figure 5:
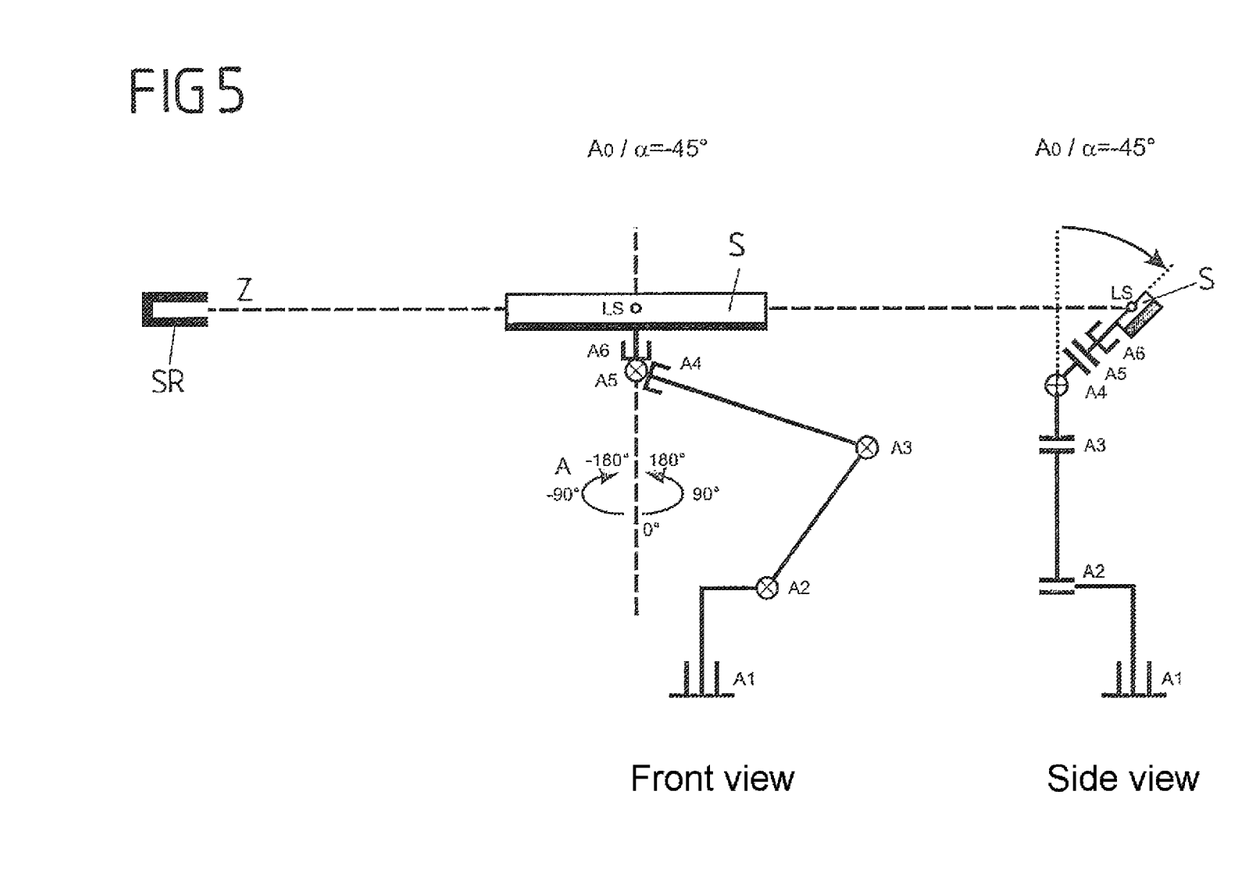
FIG. 5 shows a gonioradiometer according to the invention in a mode of operation in which a type 1.1 gonioradiometer is realized, in a second mode of operation.
Figure 6:
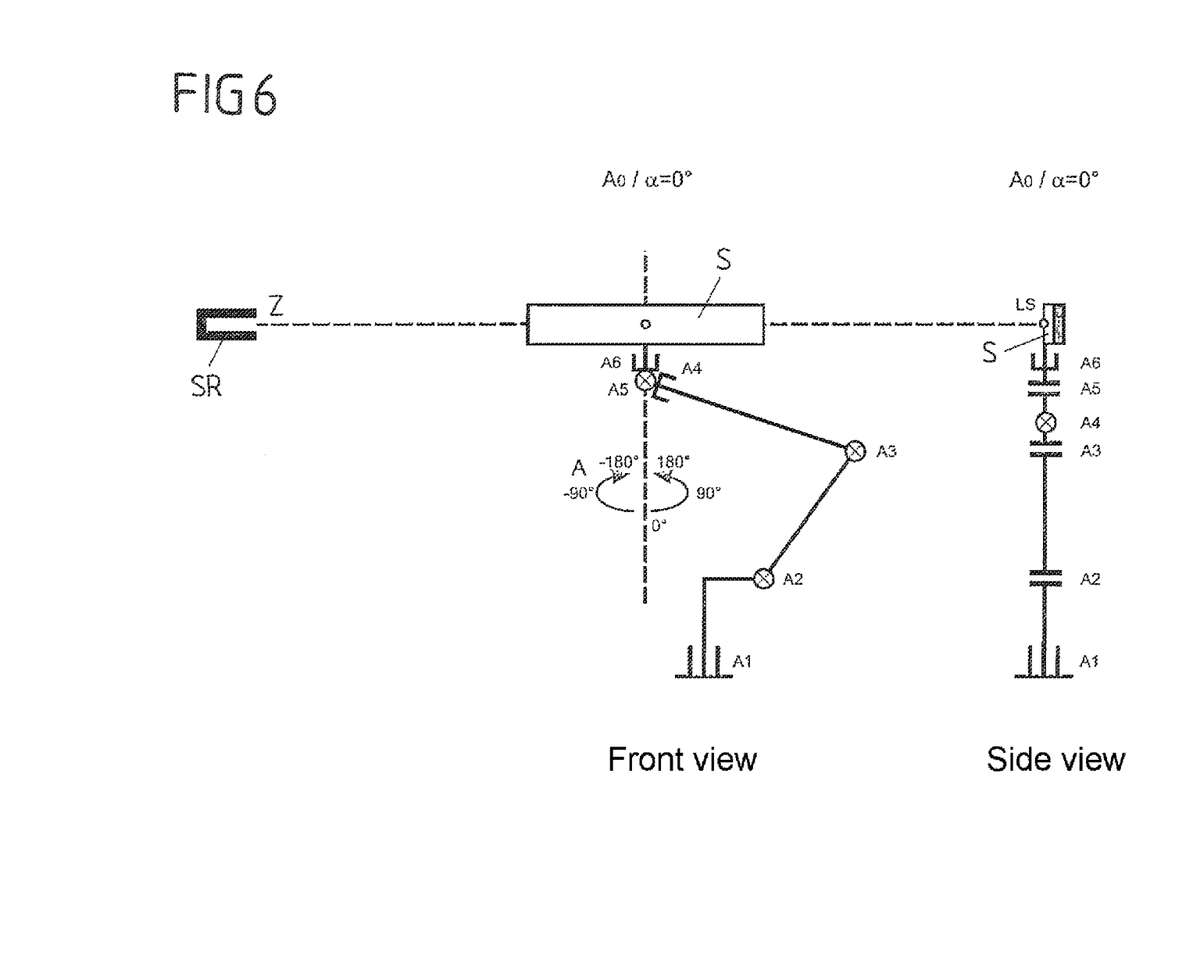
FIG. 6 shows a gonioradiometer according to the invention in a mode of operation in which a type 1.1 gonioradiometer is realized, in a variant of the second mode of operation.

FIGS. 4, 5 and 6 show configurations of a six-axis articulated robot, which realize a type 1.1 gonioradiometer. Here, FIG. 4 shows an embodiment variant in which A planes are measured while varying the emission angle α and FIGS. 5 and 6 show an embodiment in which "circles of latitude" are measured by varying the A planes. Here, for the purposes of a clearer representation, the axes A4, A5 and A6 are depicted pulled apart in the right-hand side view.

Measuring A planes requires a stationary horizontal axis, as explained in relation to FIG. 9. In the embodiment of FIG. 4, this horizontal axis is realized by the axis A6. Here, the test object (i.e. the radiation source S to be tested) is held at a 90° angle on the flange of the axis A6 in the depicted exemplary embodiment such that the emission angle α can be varied by rotation of the axis A6. In the case of this embodiment too, the light centroid LS lies in the continuation of the axis A1, and so the angle $A_x$, or the corresponding A plane, can be set by rotating the axis A1.

A continuous swivel process, during which the sensor SR continuously records measurement values, is realized by virtue of there being a rotation about the axis A6. The selection of a different A plane is effected by swiveling about the first axis A1.

This embodiment is advantageous in that, in contrast to a type 1.3 or type 1.2 gonioradiometer, it is not the fixed axis, including the mass of the moved axis, that needs to be moved together with the test object, but that the variation of α is brought about only with the mass of the test object (including the holder thereof) by way of the axis A6, and hence smaller forces need to be applied by the actuators of the robot.

FIGS. 5 and 6 show an alignment of the axes of the robot in such a way that a type 1.1 is realized, wherein however, unlike in FIG. 4, circles of latitude are measured. In accordance with FIG. 5, the test object is fastened to a fastening means which is arranged on the axis A6. In general, what holds true is that the robot has a fastening means, e.g. a fastening flange, on the axis A6. In the case of a rotation about the axis A6, the fastening means is co-rotated, and hence also the test object fastened to the fastening means.

In this embodiment, the axes A1 and A6 extend in parallel. The axis A4 extends largely horizontally in order to be able to assemble objects which are as large as possible (laterally) on the axis A6. The emission angle α, which corresponds to tilting of the fastening flange assembled on the axis A6, can therefore be largely set by the axis A4. However, in so doing, the axes A1, A2, A3 and/or A5 must subsequently be used for correcting the light centroid in order to return the light centroid LS to the original position.

A measuring process or a scanning process is carried out about the axis A6 of the articulated robot. In the process, measurement values which relate to different A planes at a considered emission angle α are detected. Accordingly, there is a measurement of a "circle of latitude" while varying the angle $A_x$.

For the purposes of selecting a different emission angle α, there is swiveling about at least the fourth axis A4, wherein, as explained, the further axes optionally contribute to the light centroid LS remaining fixed in space. After setting a different emission angle α, there once again is a scan for varying the A-planes by swiveling about the axis A6 only.

FIG. 6 shows a variant of the exemplary embodiment of FIG. 5 (with α=−45°), in which an emission angle α of 0° is set.

Figure 7:
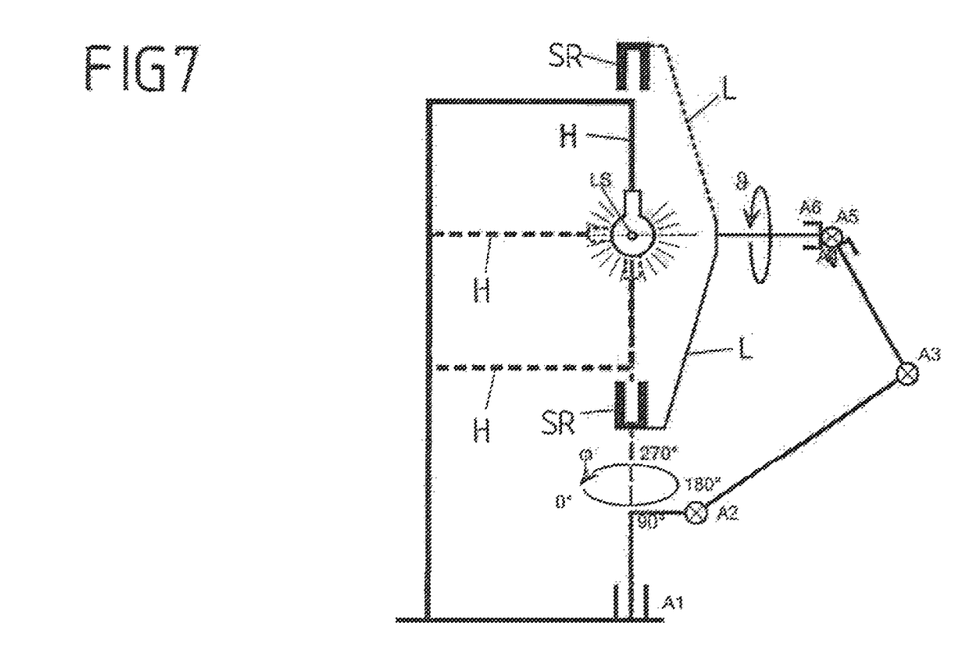
FIG. 7 shows a gonioradiometer according to the invention in a mode of operation in which a type 4 gonioradiometer is realized.

FIG. 7 shows a configuration of a six-axis articulated robot, in which the latter realizes a type 4 gonioradiometer. The latter serves to establish the irradiance or illuminance distribution on a spherical surface in order to derive integral variables such as radiant flux or luminous flux. Here, the light centroid LS of the radiation source S is held at the center of such a sphere with an intended orientation, e.g. standing, hanging or lying.

In the refinement of FIG. 7, provision is made for at least one sensor SR, which is connected to a side arm L attached to the axis A6. Here, FIG. 7 shows the sensor in 2 possible positions. Here, the axis A6 is directed to the light centroid LS. Moreover, the sensor(s) SR is/are respectively aligned and held at the side arm(s) L in such a way that the optical axis of the respective sensor SR extends at an angle of 90° in relation to the axis A6. Here, the sensor or sensors SR is/are arranged in such a way that they can scan a complete great circle during movement about the axis A6. In an alternative refinement, provision can be made for two different sensors SR, such as e.g. a photometer and spectroradiometer, to be placed very close together on a side arm L in order to record two different lighting variables simultaneously during one measurement.

By swiveling the arrangement about the axis A6, the angle θ (cf. FIG. 8) is varied and a lighting or radiometric characteristic is measured along a great circle. All other axes are rigid during this measurement. After measuring one great circle, the arrangement is advanced by one angular step about the axis A1 in the next step and the next great circle is scanned while all other axes remain fixed. Here, an adjustment about the axis A1 is along the angle φ, cf. FIG. 8.

In the arrangement of FIG. 7, provision is once again made of an overhead position of the robot, wherein the light centroid LS lies on the axis A1. By selecting the overhead position, particularly large spherical radii are realizable.

An advantage of the refinement of FIG. 7 is that the holder H of the radiation source for a standing, hanging or lying operation need not be supplied by way of a hollow shaft through an axis but that the holder H can be effected from any direction. This is indicated by the dashed holder structures H in FIG. 7. Furthermore, reference is made to the fact that, by programming, the shadow of the lamp holder, and hence the latter as well, can be kept away from the movement of the sensor within the affected great circles such that there are no collisions.

The invention therefore enables the realization of different gonioradiometers of types 1.1, 1.2, 1.3 and 1.4 with a single apparatus-type setup comprising a multi-axis articulated robot. Here, the axes of the robot are aligned in such a way that there is a rotation of the robot about only one of its axes during a measuring process, which is preferably carried out continuously.

The invention is not restricted to the exemplary embodiments depicted above. For example, the axes and swivel arm alignments depicted in the figures should merely be understood to be exemplary. Moreover, the invention is not restricted to the use of a six-axis articulated robot. Corresponding positionings can also be realized using articulated robots with a different number of axes.

The invention claimed is:
1. A method for a direction-dependent measurement of at least one photometric or radiometric characteristic of an optical radiation source (S), wherein an emission direction of the photometric or radiometric characteristic is described by using a system of planes (A, B, C), the planes of which intersect at an intersection line which passes through a radiation centroid of the radiation source, and by using an emission angle (α, β, γ) which specifies the emission direction (α, β, γ) within a considered plane,
wherein a specific plane of the system of planes (A, B, C) and a specific emission angle (α, β, γ) within this plane is assigned to each measurement value of the photometric or radiometric characteristic, and
wherein the measurement is carried out by means of via at least one sensor which is suitable for measuring the radiation of the radiation source,
the method comprising:
providing a multi-axis articulated robot to which the at least one sensor or the radiation source is fastened,
swiveling the multi-axis articulated robot to carry out a measuring process in which measurement values relating to different emission angles (α, β, γ) within a considered plane of the system of planes (A, B, C) or relating to different planes at a considered emission angle (α, β, γ) are detected by the sensor, and in which the detected measurement values specify the photometric or radiometric characteristic on a spherical surface around the radiation centroid of the radiation source, wherein the robot is only swiveled about precisely one of its axes during such measuring process, and wherein, prior to the robot swiveling about the precisely one swivel axis, the sensor or the radiation source is positioned by the robot such that the radiation centroid of the radiation source lies on the swivel axis, adjusting the robot in terms of at least one further swivel axis and swiveling the robot once again about the precisely one swivel axis after such adjustment for the purposes of measuring the photometric or radiometric characteristic in a different plane of the system of planes (A, B, C) or at a different emission angle (α, β, γ).

2. The method as claimed in claim 1, further comprising continuously moving the robot during the swiveling at least over individual angular ranges, the at least one sensor continuously recording measurement values during this continuous movement.

3. The method as claimed in claim 1, wherein, by setting the axes of the robot, the measurement is selectively carried out in one of the following standardized systems of planes: in A-planes with angles α, in B-planes with angles β or in C-planes with angles γ, where the angles α, β, γ specify the emission direction within the respective plane.

4. The method as claimed in claim 1, wherein the luminous intensity distribution, the color distribution and/or spectroradiometric information on a spherical surface around the radiation source is/are measured as photometric or radiometric characteristic.

5. A gonioradiometer for a direction-dependent measurement of at least one photometric or radiometric characteristic of an optical radiation source, the gonioradiometer comprising:
    a radiation source having a radiation centroid,
    at least one sensor which is suitable for measuring radiation of the radiation source,
    an apparatus for moving either the sensor or the radiation source during a measuring process in such a way that the sensor records measurement values which specify the photometric or radiometric characteristic on a spherical surface around the radiation centroid of the radiation source,
    wherein the emission direction of the lighting characteristic is described using a system of planes (A, B, C), the planes of which intersect at an intersection line which passes through the radiation centroid of the radiation source (S), and using an emission angle (α, β, γ) which specifies the emission direction (α, β, γ) within a considered plane,
    wherein a specific plane of the system of planes (A, B, C) and a specific emission angle (α, β, γ) within this plane is assigned to each measurement value of the photometric or radiometric characteristic,
    wherein the apparatus for moving the sensor or the radiation source comprises a multi-axis articulated robot, which has fastened thereon the sensor or the radiation source,
    wherein the robot is configured to have its axes aligned such that the robot is only swiveled about precisely one of its axes during a measuring process, in which measurement values relating to different emission angles (α, β, γ) within a considered plane of the system of planes (A, B, C) or to different planes at a considered emission angle (α, β, γ) are detected, and
    wherein the robot is further configured to position the at least one sensor or the radiation source by the other axes of the robot such that the radiation centroid of the radiation source lies on the swivel axis prior to the robot swiveling about the precisely one swivel axis.

6. The gonioradiometer as claimed in claim 5, wherein the at least one sensor or the radiation source is fastened to a holder of the robot in an overhead position.

7. The gonioradiometer as claimed in claim 5, wherein the robot is a 6-axis articulated robot, the 6-axis articulated robot comprising a first axis of rotation, a second axis of rotation, a third axis of rotation, a fourth axis of rotation, a fifth axis of rotation, and a sixth axis of rotation, the first axis of rotation being connected to a base defining a horizontal plane aligned perpendicular to the first axis of rotation, the sixth axis of rotation being connected to a mechanical interface for carrying the sensor or the radiation source, the sixth axis of rotation being arranged most distant from the first axis of rotation, and the second to fifth axes of rotation being in sequence between the first axis of rotation and the sixth axis of rotation.

8. The gonioradiometer as claimed in claim 5, wherein the gonioradiometer realizes a type 1 gonioradiometer, in which the radiation source is fastened to the robot and moved during a measuring process.

9. The gonioradiometer as claimed in claim 8, wherein the robot is a 6-axis articulated robot, the 6-axis articulated robot comprising a first axis of rotation, a second axis of rotation, a third axis of rotation, a fourth axis of rotation, a fifth axis of rotation, and a sixth axis of rotation, the first axis of rotation being connected to a base defining a horizontal plane aligned perpendicular to the first axis of rotation, the sixth axis of rotation being connected to a mechanical interface for carrying the sensor or the radiation source, the sixth axis of rotation being arranged most distant from the first axis of rotation, and the second to fifth axes of rotation being in sequence between the first axis of rotation and the sixth axis of rotation; and
    wherein the gonioradiometer realizes a type 1.1 gonioradiometer, in which the axes of the robot are aligned in such a way that, during a measuring process in which measurement values relating to different emission angles (a) within a considered plane of the system of planes (A) are detected, the robot is only swiveled about its sixth axis and that there is swiveling about the first axis for selecting a different plane of the system of planes (A).

10. The gonioradiometer as claimed in claim 8, wherein the robot is a 6-axis articulated robot, the 6-axis articulated robot comprising a first axis of rotation, a second axis of rotation, a third axis of rotation, a fourth axis of rotation, a fifth axis of rotation, and a sixth axis of rotation, the first axis of rotation being connected to a base defining a horizontal plane aligned perpendicular to the first axis of rotation, the sixth axis of rotation being connected to a mechanical interface for carrying the sensor or the radiation source, the sixth axis of rotation being arranged most distant from the first axis of rotation, and the second to fifth axes of rotation being in sequence between the first axis of rotation and the sixth axis of rotation; and
    wherein the gonioradiometer realizes a type 1.1 gonioradiometer, in which the axes of the robot are aligned in such a way that, during a measuring process in which measurement values relating to different planes of the system of planes (A) at a considered emission angle (α) are detected, the robot is only swiveled about its sixth axis and that there is swiveling at least about the fourth axis for selecting a different emission angle (α).

11. The gonioradiometer as claimed in claim 8, wherein the robot is a 6-axis articulated robot, the 6-axis articulated robot comprising a first axis of rotation, a second axis of rotation, a third axis of rotation, a fourth axis of rotation, a fifth axis of rotation and a sixth axis of rotation, the first axis of rotation being connected to a base defining a horizontal plane aligned perpendicular to the first axis of rotation, the sixth axis of rotation being connected to a mechanical interface for carrying the sensor or the radiation source, the sixth axis of rotation being arranged most distant from the first axis of rotation, and the second to fifth axes of rotation being in sequence between the first axis of rotation and the sixth axis of rotation; and wherein the gonioradiometer realizes a type 1.2 gonioradiometer, in which the axes of the robot are aligned in such a way that, during a measuring process in which measurement values relating to different emission angles (β) within a considered plane of the system of planes (B) are detected, the robot is only swiveled about its first axis and that there is swiveling at least about the fifth axis for selecting a different plane of the system of planes (B).

12. The gonioradiometer as claimed in claim 11, wherein the robot is configured to align its axis in such a way that, in the case of angles $B_x$ of the planes of the system of planes (B) at which X>0° and at which there may be collisions between the radiation source or the radiation source holder and articulated arms of the robot, the corresponding B-planes are rotated by 180° by rotation about the sixth axis and measurements are carried out in the planes rotated by 180°, wherein there likewise is a rotation by 180° about the fifth axis in order to reach the collision-free region.

13. The gonioradiometer as claimed in claim 8, wherein the robot is a 6-axis articulated robot, the 6-axis articulated robot comprising a first axis of rotation, a second axis of rotation, a third axis of rotation, a fourth axis of rotation, a fifth axis of rotation, and a sixth axis of rotation, the first axis of rotation being connected to a base defining a horizontal plane aligned perpendicular to the first axis of rotation, the sixth axis of rotation being connected to a mechanical interface for carrying the sensor or the radiation source, the sixth axis of rotation being arranged most distant from the first axis of rotation, and the second to fifth axes of rotation being in sequence between the first axis of rotation and the sixth axis of rotation; and wherein the gonioradiometer realizes a type 1.3 gonioradiometer, in which the axes of the robot are aligned in such a way that, during a measuring process in which measurement values relating to different emission angles (γ) within a considered plane of the system of planes (C) are detected, the robot is only swiveled about its first axis and that there is swiveling about the sixth axis for selecting a different plane of the system of planes (C).

14. The gonioradiometer as claimed in claim 5, wherein the gonioradiometer realizes a type 4 gonioradiometer, in which the at least one sensor is fastened to the robot and moved during a measuring process, and in which the system of planes is formed by planes which extend through the center of a sphere which is formed by the radiation centroid of the radiation source.

15. The gonioradiometer as claimed in claim 14,
wherein the robot is a 6-axis articulated robot, the 6-axis articulated robot comprising a first axis of rotation, a second axis of rotation, a third axis of rotation, a fourth axis of rotation, a fifth axis of rotation, and a sixth axis of rotation, the first axis of rotation being connected to a base defining a horizontal plane aligned perpendicular to the first axis of rotation, the sixth axis of rotation being connected to a mechanical interface for carrying the sensor or the radiation source, the sixth axis of rotation being arranged most distant from the first axis of rotation, and the second to fifth axes of rotation being in sequence between the first axis of rotation and the sixth axis of rotation; and wherein the robot is configured to align its axis in such a way that, during a measuring process in which measurement values relating to different emission angles within a considered plane of the system of planes are detected, the robot is only swiveled about its sixth axis, and that there is swiveling about the first axis for selecting a different plane of the system of planes.

16. The gonioradiometer as claimed in claim 15, wherein the at least one sensor is connected to the robot by way of a side arm in such a way that the at least one sensor passes over a great circle around the radiation centroid of the radiation source when swiveling the robot about the sixth axis.

17. The gonioradiometer as claimed in claim 5, wherein the sensor is formed by a photometer.

18. The gonioradiometer as claimed in claim 5, wherein the robot is configured to carry out a continuous movement during a measuring process when swiveling about precisely one of its axes and the sensor is configured to continuously record measurement values during the continuous movement.

* * * * *

UNITED STATES PATENT AND TRADEMARK OFFICE
CERTIFICATE OF CORRECTION

PATENT NO. : 10,265,873 B2
APPLICATION NO. : 15/128393
DATED : April 23, 2019
INVENTOR(S) : Carsten Diem et al.

It is certified that error appears in the above-identified patent and that said Letters Patent is hereby corrected as shown below:

In the Claims

Column 12, Line 47, Claim 1     after "out", delete "by means of"

Column 14, Line 35, Claim 9     delete "(a)", insert -- ($\alpha$) --

Signed and Sealed this
Third Day of March, 2020

Andrei Iancu
*Director of the United States Patent and Trademark Office*